2,880,192

RUBBERY COMPOSITION COMPRISING A CRYSTALLINE POLYESTER AND A LIQUID POLYESTER REACTED WITH A DIISOCYANATE

David Hay Coffey, Philip Cowey Johnson, and Henry George White, Blackley, Manchester, England, assignors to Imperial Chemical Industries Limited, London, England, a corporation of Great Britain No Drawing. Application January 10, 1955
Serial No. 481,012

Claims priority, application Great Britain January 18, 1954

3 Claims. (Cl. 260—45.4)

This invention relates to improvements in or relating to polymeric materials and more particularly to organic polyisocyanate modified polyesters and polyesteramides and to articles and other compositions made therefrom.

According to the present invention we provide polymeric materials obtainable by reacting organic polyisocyanates with mixtures of from 5 to 30% by weight of crystalline polyesters or polyesteramides and from 95 to 70% by weight of polyesters or polyesteramides that are liquid at 50° C. or below.

We have found that such polymeric materials have excellent rubber-like properties.

The polyesters or polyesteramides may be formed conveniently by heating the selected reactants at polymerising temperatures in the absence of air or oxygen under conditions whereby water is removed from the reaction mixture in any conventional manner. Conventional esterification catalysts may be used. Usually the polyester is formed from a glycol and a dibasic dicarboxylic acid or an ester-forming derivative of either or both of these. Usually the polyesteramide is formed from a glycol, a dibasic carboxylic acid or acid chloride and an alkylolamine or a diamine.

Crystalline polyesters suitable for use in this invention include those prepared from tetramethylene, hexamethylene, or decamethylene glycol and succinic, adipic, suberic, azelaic, sebacic or terephthalic acid. Polyethylene succinate and polyethylene sebacate may also be used. Crystalline polyesteramides may be prepared by replacing a small proportion of the glycol by, for example, an equivalent amount of β-aminoethyl alcohol or ethylene, tetramethylene or hexamethylene diamine.

Liquid polyesters or polyesteramides may most readily be obtained by using glycols or acids at least one of which contains a —C—O—C— grouping, or a pendant group such as an alkyl group. Low-melting polymers may also be obtained by using glycols or acids containing an odd number of carbon atoms between the functional groups. Suitable liquid polyesters include those from 1:2-propylene glycol, 1:3-butylene glycol, diethylene glycol, or triethylene glycol, and succinic, glutaric, adipic, methyladipic, pimelic, suberic, azelaic and sebacic acids; and those from ethylene, tetramethylene and hexamethylene glycols and alkyladipic acid. Polyethylene glutarate and polyethylene adipate also are suitable low-melting polymers. Liquid polyesters and polyesteramides may also be obtained by the use of mixtures of glycols, aminoalcohols or diamines on the one hand, or of dicarboxylic acids on the other, in suitable proportions. Thus ethylene succinate is highly crystalline but a copolymer prepared from ethylene glycol and equal molar amounts of succinic and adipic acid melts below 50° C.

The liquid polyester or polyesteramide, when reacted with an organic diisocyanate using a ratio of 1 mole of polymer to 0.9 to 1.2 moles of organic diisocyanate gives a rubber-like product.

Preferably the polyesters and polyesteramides used have a molecular weight of 1000 or more. Molecular weight is usually determined by analysing the end groups of the polymers and by calculation from the results thereof.

Examples of polyisocyanates include tetramethylene diisocyanate, hexamethylene diisocyanate, p-phenylene diisocyanate, m-phenylene diisocyanate, diphenyl-4:4'-diisocyanate, chlorphenylene diisocyanate, diphenylmethane-4:4'-diisocyanate, toluylene diisocyanates and naphthalene diisocyanates.

The mixed polyesters or polyester and polyesteramide are modified with the organic polyisocyanate in known manner, for example, by mixing them by stirring, milling or kneading with the organic polyisocyanate and then heating the mixture, for example, at a temperature of 100–200° C. for a time of 10 minutes to 12 hours. Usually 1.0 to 1.2 moles of an organic diisocyanate are reacted with a total of 1.0 mole of polyester and/or polyesteramide. Alternatively the mixed polyesters or polyester and polyesteramide are reacted with an excess of organic polyisocyanate to give a product which is a pourable liquid at 100–150° C. and are then mixed with a quantity of a difunctional compound, for example, a glycol, diamino or amino alcohol, equivalent to the excess of organic polyisocyanate, poured into moulds and heated, for example, for 40 hours at 110° C., to complete the reaction to give a cured rubber.

It is well known to obtain rubber-like materials by reacting certain polyesters and polyesteramides with organic polyisocyanates. In order to obtain a rubber-like material according to the prior art process the polyesters and polyesteramides must be liquids or low melting crystalline solids, or random copolymers possessing only a low degree of crystallinity. The modification of mixtures of polyesters with organic polyisocyanates is also known to give rubber-like materials provided that the individual polyesters reacted separately with the same organic polyisocyanate also give rubber-like materials.

We have now found that mixtures of polyesters and/or polyesteramides, which contain up to 30% of a crystalline component which alone reacted with an organic polyisocyanate gives a hard crystalline plastic material and not a rubber, can be reacted with a polyisocyanate to give a rubber-like material if the component present to an extent of at least 70% is one which individually would yield a rubber-like material. For example polyethylene sebacate or polyethylene succinate reacted with diisocyanates give hard crystalline materials but up to 30° of these polymers in admixture with polypropylene adipate can be reacted with diisocyanates to give a rubber-like material; if quantities of for example polyethylene sebacate or succinate appreciably greater than 30% are used then the products are no longer rubber-like at ordinary temperatures. The use of mixtures containing crystalline polymers such as polyethylene sebacate and non-crystalline polymers, for reaction with polyisocyanates gives rubber-like materials having superior mechanical properties to those materials in which a crystalline component such as polyethylene sebacate is not used. In order that a measurable improvement in properties be obtained, the amount of crystalline component such as polyethylene sebacate should be at least 5%.

We have further found that this type of copolymer made using the previously defined types and quantities of components and in which the two or more kinds of repeat units are arranged in blocks, has properties superior to random copolymers in which the repeat units are arranged in a completely random manner.

Other ingredients can be incorporated in the compositions. These include curing agents and curing catalysts of the kinds described in United Kingdom specifications Nos. 580,524 and 580,526, additional organic polyisocyanates and tertiary amines, fillers such as carbon black, iron oxides, clay, asbestos, blanc fixe, whiting, lithopone, other inorganic or organic pigments, plasticisers, and blowing agents to produce compositions in an expanded form.

The compositions of the invention may be used in the fabrication of a variety of articles in which they may or may not be supported on a substrate.

The invention is illustrated but not limited by the following example in which parts and percentages are expressed by weight.

*Example 1*

A stream of carbon dioxide is passed through a mixture of 2121 parts of sebacic acid and 781 parts of ethylene glycol stirred at 158° C. rising to 230° C. during 3¼ hours. After heating at 225°–230° C. for another 5¼ hours, 342 parts of water are collected by distillation and polyethylene sebacate is obtained with an acid value of 0.9 mg. KOH per gm. and a hydroxyl value of 64.2 mgs. KOH per gm.

A stream of carbon dioxide is passed through a mixture of 1898 parts of adipic acid, 1606 parts of diethylene glycol and 3½ parts of phosphoric acid stirred at 163° C. rising to 230° C. during 2¼ hours. After heating at 230° C. for another 10½ hours, 438 parts of water are collected by distillation and a polydiethylene adipate is obtained with an acid value of 1.0 mg. KOH per gm. and a hydroxyl value of 65.4 mgs. KOH/gm.

45 parts of the polyethylene sebacate and 105 parts of the polydiethylene adipate prepared as described above are dried separately by stirring at 150–160° C. for 45 minutes under a pressure of 15 mms. of mercury and are then stirred together with 0.15 part of adipic acid for 10 minutes at 150° C. 22.2 parts of naphthylene-1:5-diisocyanate are added, the mixture is stirred for 10 minutes at 160° C. under a pressure of 15 mms., poured into a mould and cured by heating in an oven at 110° C. for 40 hours. The resultant rubber-like sheet has the following properties:

| | |
|---|---|
| Tensile strength | 209 kg./cm.² |
| Elongation at break | 760% |
| Permanent set | 22% |
| Tear strength | 43 kg./cm.² |
| Resilience | 73.5% |
| Hardness (° B.S.) | 73 |

A rubber prepared similarly from a polydiethylene adipate/polyethylene sebacate (70:30) random copolymer has the following properties:

| | |
|---|---|
| Tensile strength | 127 kg./cm.² |
| Elongation at break | 600% |
| Permanent set | 20% |
| Tear strength | 35 kg./cm.² |
| Resilience | 65% |
| Hardness (° B.S.) | 75 |

*Example 2*

A stream of carbon dioxide is passed through a mixture of 2336 parts of adipic acid and 1115 parts of ethylene glycol stirred at 150° C. rising to 250° C. during 3 hours. After heating at 250° C. for another 5½ hours a total of 592 parts of water is collected by distillation. The product, polyethylene adipate, has an acid value of 2.7 mg. KOH per gm., a hydroxyl value of 61.9 mg. KOH/gm. and a melting point of 48° C. determined using a penetrometer as described by Edgar and Hill (Journal of Polymer Science, 1952, volume 8, page 1).

A stream of carbon dioxide is passed through a mixture of 2124 parts of succinic acid and 1225 parts of ethylene glycol stirred at 145° C. rising to 230° C. during 3 hours. After heating at 230° C. for another 11½ hours a total of 658 parts of water is collected by distillation. The product, polyethylene succinate, has an acid value of 1.75 mg. KOH/gm., a hydroxyl value of 36.4 mg. KOH/gm., and a melting point of 105° C. determined using a penetrometer as before.

85 parts of the polyethylene adipate and 15 parts of the polyethylene succinate are dried separately by stirring at 150° C. for 45 minutes under a pressure of 15 mms. of mercury, and are then mixed together with 0.2 part of adipic acid and stirred for 5 minutes at 130° C. 14.8 parts of naphthylene-1:5-diisocyanate are added and the mixture is stirred for 15 minutes at 130–140° C. under a pressure of 15 mms. of mercury, poured into a mould and cured by heating in an oven at 110° C. for 40 hours. The resultant rubber-like sheet has the following properties:

| | |
|---|---|
| Tensile strength | 533 kg./cm.² |
| Elongation at break | 680% |
| Permanent set | 5% |
| Tear strength | 107 kg./cm.² |
| Resilience at 50° C. | 75% |
| Hardness (° B.S.) | 80 |

A rubber prepared similarly from the corresponding random copolymer is much inferior in properties.

*Example 3*

A mixture of 472 parts of hexamethylene glycol, 488 parts of dimethyl terephthalate and 0.1 part of zinc acetate are stirred at 157° C. rising to 218° C. in 4 hours giving 184 parts of methanol which are collected by distillation. The mixture is then stirred for 1 hour at 150° C. rising to 180° C. and reducing the pressure from 12 mm. to 0.25 mm. of mercury. After stirring at 180–190° C. under a pressure of less than 0.25 mm. of mercury for another 2¼ hours a hexamethylene terephthalate is obtained having an acid value of 0.1 mg. KOH per gm., a hydroxyl value of 34.9 mg. KOH per gm. and a melting point of 154° C. determined using a penetrometer as in Example 2.

85 parts of the polyethylene adipate used in Example 2 and 15 parts of hexamethylene terephthalate prepared as described above are dried separately by stirring at 150° C. for 1 hour under a pressure of 15 mm. of mercury and are then mixed together, treated with 0.2 part of adipic acid and stirred for 5 minutes at 145° C. 12.4 parts of naphthylene-1:5-diisocyanate are added and the mixture is stirred for 10 minutes at 135–145° C. under a pressure of 15 mm. of mercury, poured into a mould and cured by heating in an oven at 110° C. for 40 hours. The resultant rubber-like sheet has the following properties:

| | |
|---|---|
| Tensile strength | 448 kg./cm.² |
| Elongation at break | 775% |
| Permanent set | 40% |
| Tear strength | 112 kg./cm.² |
| Resilience at 50° C. | 74% |
| Hardness (° B.S.) | 74 |

A rubber prepared similarly from the corresponding random copolymer is much inferior in properties.

*Example 4*

A stream of carbon dioxide is passed through a mixture of 2294 parts of glutaric acid and 1212 parts of ethylene glycol stirred at 140° C. rising to 230° C. during 5 hours. After heating at 230° C. for another 10 hours, 613 parts of water are collected by distillation and polyethylene glutarate is obtained which has an acid value of 1.6 mg. KOH per gm. and a hydroxyl value of 55.6 mg. KOH per gm., and is liquid at room temperature.

64 parts of this polyester and 16 parts of the polyethylene succinate used in Example 2 are dried separately by stirring for 1 hour at 130° C. under a pressure of 15 mms. of mercury, and are then mixed together with 0.2 part of adipic acid for 5 minutes at 130° C. 9.6 parts of naphthylene-1:5-diisocyanate are added and the mixture is stirred for 5 minutes at 130° C. under a pressure of 15 mms. of mercury, poured into a mould and cured by heating in an oven at 110° C. for 42 hours. The rubber-like product has the following properties:

| | |
|---|---|
| Tensile strength | 347 kg./cm.² |
| Elongation at break | 950% |
| Permanent set | 20% |
| Tear strength | 59 kg./cm.² |
| Hardness (° B.S.) | 64 |

What we claim is:

1. A polymeric material obtained by reacting a mixture of from 5 to 30% by weight of at least one crystalline linear polyester free from ethylenic unsaturation obtained by the esterification of a dicarboxylic acid and a member selected from the group consisting of glycol, and glycol mixtures containing a small proportion of an amine selected from the group consisting of hydroxy amines and diamines and from 95 to 70% by weight of at least one linear polyester liquid below 50° C. and free from ethylenic unsaturation obtained by the esterification of a dicarboxylic acid and a member selected from the group consisting of glycol and glycol mixtures containing a small proportion of an amine selected from the group consisting of hydroxy amines and diamines with at least from about 0.9 to 1.2 mols, per total of one mol of said mixed polyesters, of an organic polyisocyanate.

2. Polymeric materials as claimed in claim 1 wherein said polyesters have a molecular weight of at least 1000.

3. Polymeric materials as claimed in claim 1 wherein 1.0 to 1.2 moles of an organic diisocyanate are reacted with a total of 1.0 mole of polyester.

References Cited in the file of this patent

UNITED STATES PATENTS

| | | |
|---|---|---|
| 2,621,166 | Schmidt et al. | Dec. 9, 1952 |
| 2,642,403 | Simon | June 16, 1953 |
| 2,691,006 | Flory | Oct. 5, 1954 |
| 2,780,613 | Rubens | Feb. 5, 1957 |

FOREIGN PATENTS

| | | |
|---|---|---|
| 640,597 | Great Britain | July 26, 1950 |
| 700,611 | Great Britain | Dec. 9, 1953 |